(12) United States Patent
Lai

(10) Patent No.: US 11,709,054 B2
(45) Date of Patent: Jul. 25, 2023

(54) TWO-LINE LASER EMITTER

(71) Applicant: AUTEL INTELLIGENT TECHNOLOGY CORP., LTD., Guangdong (CN)

(72) Inventor: Biwang Lai, Guangdong (CN)

(73) Assignee: AUTEL INTELLIGENT TECHNOLOGY CORP., LTD., Guangdong (CN)

( * ) Notice: Subject to any disclaimer, the term of this patent is extended or adjusted under 35 U.S.C. 154(b) by 86 days.

(21) Appl. No.: 17/447,650

(22) Filed: Sep. 14, 2021

(65) Prior Publication Data

US 2021/0404807 A1 Dec. 30, 2021

Related U.S. Application Data

(63) Continuation of application No. PCT/CN2020/080440, filed on Mar. 20, 2020.

(30) Foreign Application Priority Data

Mar. 21, 2019 (CN) .......................... 201910219432.4

(51) Int. Cl.
*G01C 15/00* (2006.01)
*G01C 25/00* (2006.01)

(52) U.S. Cl.
CPC .......... *G01C 15/004* (2013.01); *G01C 25/00* (2013.01)

(58) Field of Classification Search
CPC ............................. G01C 15/004; G01C 25/00
(Continued)

(56) References Cited

U.S. PATENT DOCUMENTS 5,748,306 A * 5/1998 Louis ..................... G01B 11/26
356/153
5,836,081 A * 11/1998 Orosz, Jr. ............ A61B 5/0215
33/290
(Continued)

FOREIGN PATENT DOCUMENTS

CN 2640685 Y 9/2004
CN 2640685 Y 9/2004
(Continued)

OTHER PUBLICATIONS

Partial Supplementary European Search Report dated Apr. 20, 2022; Appln. No. 20773816.2.
(Continued)

*Primary Examiner* — Christopher W Fulton

(57) ABSTRACT

A two-line laser emitter is provided. The two-line laser emitter includes a housing, a laser emitter base mounted inside the housing, an elastic clamping member, a laser emitter and a pair of rotation adjustment screws. The laser emitter base has a laser emitter mounting hole. The laser emitter is mounted in the laser emitter mounting hole, and one end of the laser emitter is inserted into the elastic clamping member. A pair of rotation adjustment screws are disposed in the laser emitter base and located on the same side of a central axial plane of the laser emitter. The pair of rotation adjustment screws abut against a side wall of the laser emitter in opposite directions on the same straight line. Each of the rotation adjustment screws is adjustable to slightly adjust a rotation angle of the planar ray of light emitted by the laser emitter.

15 Claims, 8 Drawing Sheets

(58) Field of Classification Search
USPC .......................................................... 33/290
See application file for complete search history.

(56) References Cited

U.S. PATENT DOCUMENTS

| | | | | |
|---|---|---|---|---|
| 6,739,062 | B2* | 5/2004 | Jan | G01C 15/12 33/286 |
| 6,807,740 | B2* | 10/2004 | Reed | G01C 15/006 33/286 |
| 7,055,252 | B2* | 6/2006 | Wu | G01C 15/00 33/286 |
| 7,237,342 | B2* | 7/2007 | Chen | G01S 7/4972 33/286 |
| 7,730,624 | B2* | 6/2010 | Nishimura | G01C 15/004 33/290 |
| 11,047,681 | B2* | 6/2021 | Yuen | G01C 15/06 |
| 2004/0177523 | A1 | 9/2004 | Chang et al. | |
| 2005/0246912 | A1* | 11/2005 | Marshall | G01C 15/008 33/286 |
| 2006/0070251 | A1* | 4/2006 | Wu | G01C 15/004 33/286 |
| 2007/0109808 | A1* | 5/2007 | Hobden | G01C 15/004 33/227 |
| 2009/0193671 | A1* | 8/2009 | Sergyeyenko | G01C 15/02 33/290 |
| 2015/0000144 | A1* | 1/2015 | Yuen | G01C 9/06 33/285 |

FOREIGN PATENT DOCUMENTS

| | | | | |
|---|---|---|---|---|
| CN | 101241008 | A | | 8/2008 |
| CN | 201242434 | Y * | 5/2009 | ........... G01C 15/004 |
| CN | 207515800 | U | | 6/2018 |
| CN | 210165953 | U | | 3/2020 |
| EP | 1632748 | A2 | | 3/2006 |
| EP | 1632748 | A3 | | 3/2006 |
| JP | 2010025631 | A | | 2/2010 |

OTHER PUBLICATIONS

International Search Report dated May 29, 2020; PCT/CN2020/080440.

* cited by examiner

TWO-LINE LASER EMITTER

CROSS-REFERENCE TO RELATED APPLICATIONS

The present application is a continuation application of International Application No. PCT/CN2020/080440, filed on Mar. 20, 2020, which claims priority of Chinese Patent Application No. 201910219432.4, filed on Mar. 21, 2019, which is incorporated herein by reference in its entirety.

TECHNICAL FIELD

The disclosure relates to the field of automobile calibration, and in particular, to a two-line laser emitter used in the automobile calibration.

BACKGROUND

Currently, most of laser emitters presented in the market are single-line laser emitters, three-line laser emitters and five-line laser emitters, but two-line laser emitters are rare. In some scenarios where only a two-line laser emitter is required, other multi-line laser emitters therein seem wasteful. In the prior art, the two-line laser emitter is inconvenient to adjust, does not allow multi-dimensional adjustment, and is inconvenient for factory batch assembly and self-calibration by customers. As a result, user requirements cannot be satisfied.

SUMMARY OF THE DISCLOSURE

In order to overcome the shortcomings in the prior art, embodiments of the disclosure provide a two-line laser emitter to achieve multi-dimensional adjustment.

The embodiments of the disclosure adopt the following technical solution to resolve the technical problem.

A two-line laser emitter, including:

a housing;

a laser emitter base mounted inside the housing, the laser emitter base having a laser emitter mounting hole;

an elastic clamping member mounted in the laser emitter mounting hole;

a laser emitter mounted in the laser emitter mounting hole, one end of the laser emitter being inserted into the elastic clamping member, and the laser emitter being configured to emit a planar ray of light out of the housing; and a pair of rotation adjustment screws disposed in the laser emitter base and located on the same side of a central axial plane of the laser emitter, the pair of rotation adjustment screws abutting against a side wall of the laser emitter in opposite directions on the same straight line, and each of the rotation adjustment screws being adjustable to slightly adjust a rotation angle of the planar ray of light emitted by the laser emitter.

The laser emitter is a horizontal laser emitter. The laser emitter mounting hole is a horizontal laser emitter mounting hole. The elastic clamping member is a horizontal laser emitter elastic clamping member. The pair of rotation adjustment screws are a pair of first rotation adjustment screws.

The laser emitter base further has a vertical laser emitter mounting hole.

The two-line laser emitter further includes:

a vertical laser emitter elastic clamping member mounted in the vertical laser emitter mounting hole;

a vertical laser emitter mounted in the vertical laser emitter mounting hole, one end of the vertical laser emitter being inserted into the vertical laser emitter elastic clamping member, and the vertical laser emitter being configured to emit a planar ray of light out of the housing; and a pair of second rotation adjustment screws disposed in the laser emitter base and located on the same side of a central axial plane of the vertical laser emitter, the pair of second rotation adjustment screws abutting against a side wall of the vertical laser emitter in opposite directions on the same straight line, each of the second rotation adjustment screws being adjustable to slightly adjust a rotation angle of the planar ray of light emitted by the vertical laser emitter, the planar ray of light emitted by the horizontal laser emitter being perpendicular to the planar ray of light emitted by the vertical laser emitter.

A central axis of the horizontal laser emitter and a central axis of the vertical laser emitter are arranged at a preset included angle in the same vertical plane.

The preset included angle is 45 degrees.

Each of the horizontal laser emitter and the vertical laser emitter has a pair of abutting faces. The pair of abutting faces respectively correspond to the pair of rotation adjustment screws. One of the rotation adjustment screws abuts against a corresponding one of the abutting faces.

The abutting faces are grooves recessed into the laser emitter.

The two-line laser emitter further includes a pair of first swing adjustment screws horizontally disposed in the laser emitter base and located on the central axial plane of the horizontal laser emitter. The pair of first swing adjustment screws abut against the side wall at another end of the horizontal laser emitter in opposite directions on the same straight line. Each of the first swing adjustment screws is adjustable to slightly adjust an up-and-down swing angle of the planar ray of light emitted by the horizontal laser emitter.

The two-line laser emitter further includes a pair of second swing adjustment screws horizontally disposed in the laser emitter base and located on the central axial plane of the vertical laser emitter. The pair of second swing adjustment screws abut against the vertical laser emitter in opposite directions on the same straight line. Each of the second swing adjustment screws is adjustable to slightly adjust a left-and-right swing angle of the planar ray of light emitted by the vertical laser emitter.

According to another aspect, an embodiment of the disclosure provides a method for calibrating a two-line laser emitter. The two-line laser emitter includes a horizontal laser emitter and a vertical laser emitter. The method includes:

emitting, by the horizontal laser emitter, a first planar ray of light, and emitting, by the vertical laser emitter, a second planar ray of light;

adjusting a rotation angle of the horizontal laser emitter, so that the first planar ray of light is rotated to be parallel to a first preset position;

adjusting an up-and-down swing angle of the horizontal laser emitter, so that the first planar ray of light is moved to coincide with the first preset position;

adjusting a rotation angle of the vertical laser emitter, so that the second planar ray of light is rotated to be parallel to a second preset position; and adjusting a left-and-right swing angle of the vertical laser emitter, so that the second planar ray of light is moved to coincide with the second preset position, the first planar ray of light and the second planar ray of light being perpendicular to each other.

The first planar ray of light is rotated to be parallel to the first preset position by adjusting a pair of first rotation adjustment screws.

The first planar ray of light is moved to coincide with the first preset position by adjusting the pair of first swing adjustment screws.

The second planar ray of light is rotated to be parallel to the second preset position by adjusting a pair of second rotation adjustment screws.

The second planar ray of light is moved to coincide with the second preset position by adjusting the pair of second swing adjustment screws.

Before the adjusting a rotation angle of the horizontal laser emitter, the method further includes applying glue to the first rotation adjustment screws, the second rotation adjustment screws, the first swing adjustment screws, and the second swing adjustment screws.

After the adjusting a left-and-right swing angle of the vertical laser emitter, the method further includes applying glue between the horizontal laser emitter and a corresponding elastic clamping member and applying glue between the vertical laser emitter and another corresponding elastic clamping member.

Compared with the prior art, in the two-line laser emitter provided in the embodiments of the disclosure, the vertical laser emitter and the horizontal laser emitter are mounted in the laser emitter base and a plurality of adjustment elements are disposed in the laser emitter base and are connected to the vertical laser emitter and horizontal laser emitter. The corresponding adjustment elements can perform multi-dimensional adjustment on emission angles of the vertical laser emitter and/or the horizontal laser emitter. Therefore, the two-line laser emitter can accurately emit different planar rays of light, facilitating self-calibration for users.

BRIEF DESCRIPTION OF THE DRAWINGS

One or more embodiments are exemplarily described with reference to the corresponding figures in the accompanying drawings. The descriptions are not to be construed as limiting the embodiments. Elements in the accompanying drawings that have same reference numerals are represented as similar elements. Unless otherwise particularly stated, the figures in the accompanying drawings are not drawn to scale.

DETAILED DESCRIPTION OF THE DISCLOSURE

For ease of understanding the disclosure, the disclosure is described in more detail below with reference to the accompanying drawings and specific embodiments. It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. The terms "vertical", "horizontal", "left", "right", "inner", "outside" and similar expressions used in this specification are merely used for an illustrative purpose.

Unless otherwise defined, meanings of all technical and scientific terms used in this specification are the same as those usually understood by those skilled in art of the disclosure. Terms used in the specification of the disclosure are merely intended to describe objectives of the specific embodiment, and are not intended to limit the disclosure. The term "and/or" used in this specification includes any or all combinations of one or more related listed items.

To make the objectives, technical solutions and advantages of the disclosure clearer and more comprehensible, the following further describes the disclosure in detail with reference to the accompanying drawings and embodiments. It should be understood that the specific embodiments described herein are merely used to explain the disclosure but are not intended to limit the disclosure.

Figure 1:
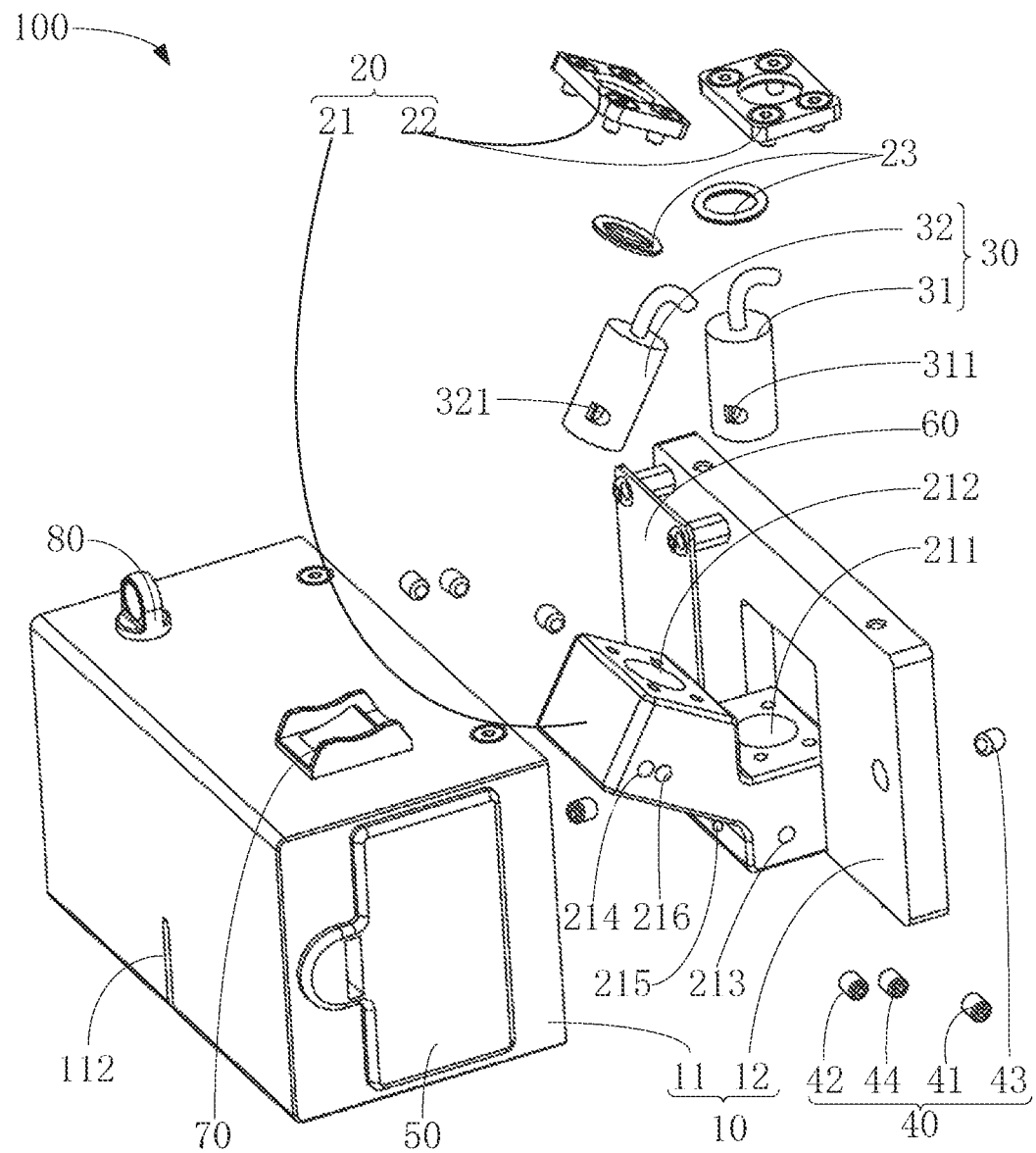
FIG. 1 is an exploded view of a two-line laser emitter according to an embodiment of the disclosure.
Figure 2:
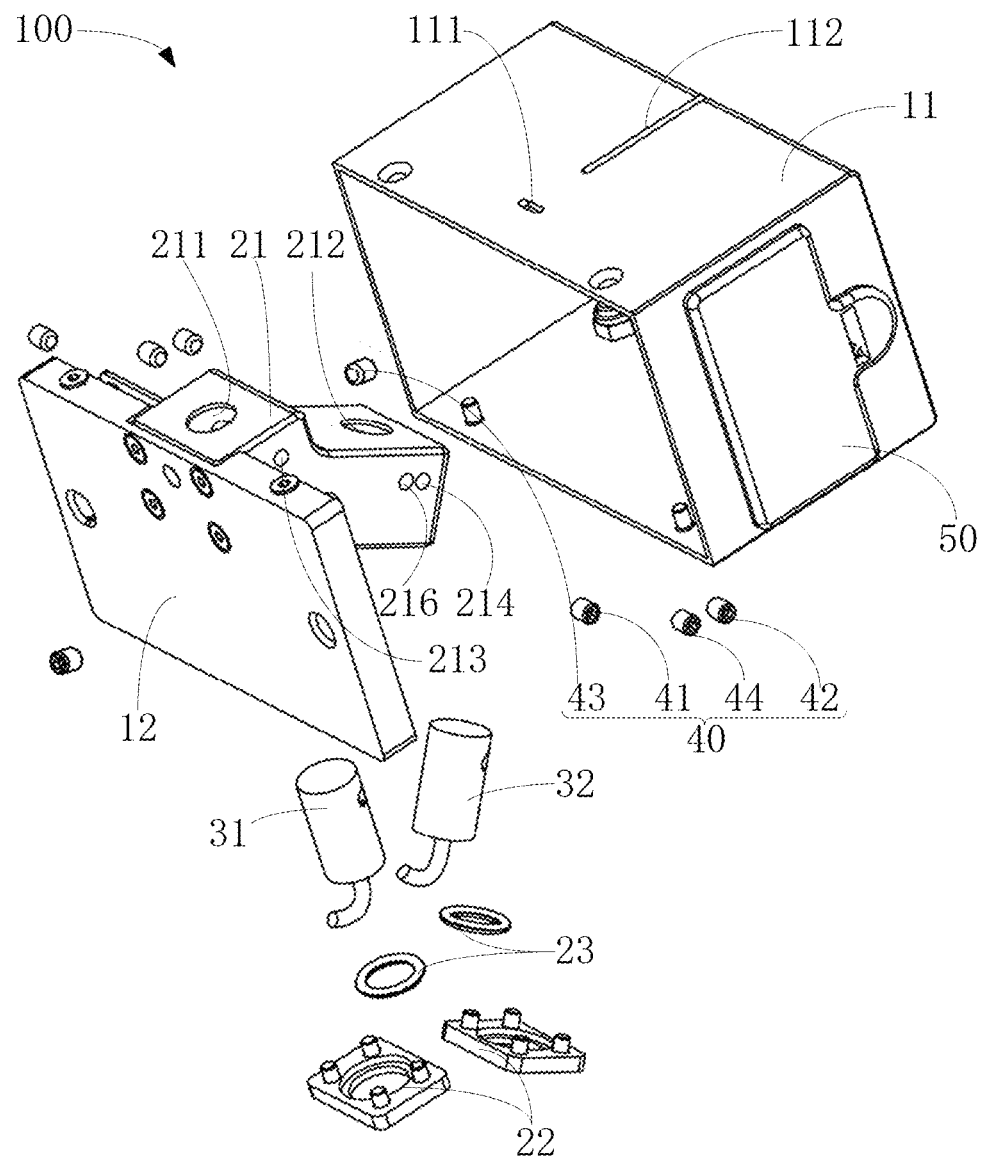
FIG. 2 is a schematic diagram of the two-line laser emitter in FIG. 1 from another perspective.
Figure 3:
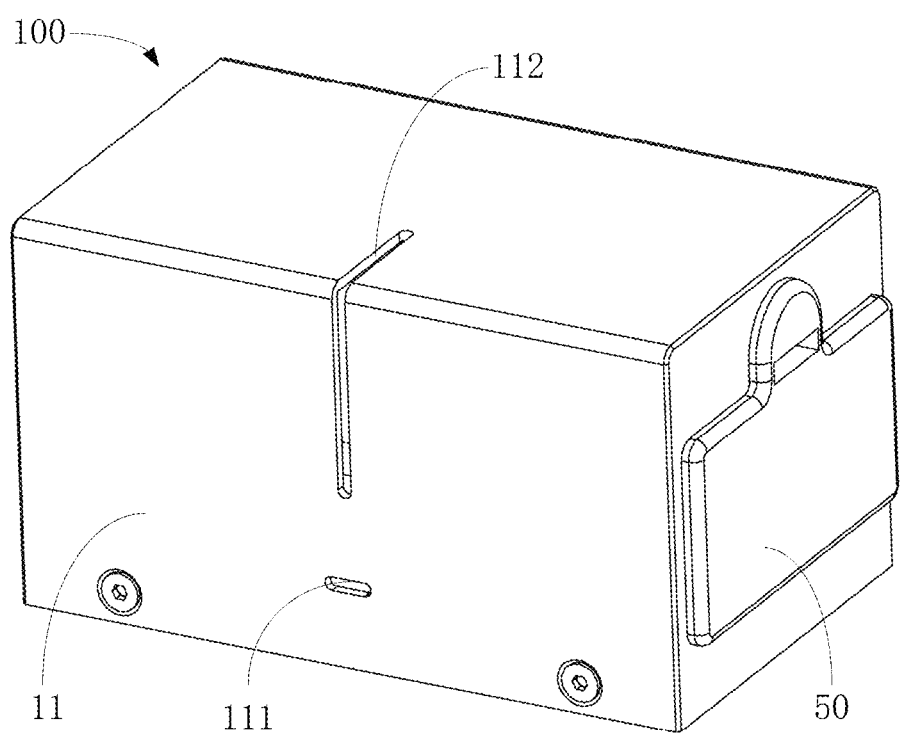
FIG. 3 is a schematic structural diagram of the two-line laser emitter.

Referring to FIG. 1 to FIG. 3, a two-line laser emitter 100 according to an embodiment of the disclosure is configured to calibrate a vehicle. The two-line laser emitter 100 includes a housing 10, a laser emitter base 20, a laser emitter 30 and adjustment elements 40. The laser emitter base 20 is mounted inside the housing 10. The laser emitter 30 includes a horizontal laser emitter 31 and a vertical laser emitter 32. The horizontal laser emitter 31 and the vertical laser emitter 32 are mounted in the laser emitter 30 to respectively emit a first planar ray of light and a second planar ray of light out of the housing 10. The adjustment elements 40 are disposed in the laser emitter base 20 to adjust emission angles of the horizontal laser emitter 31 and the vertical laser emitter 32 respectively. In this way, the first planar ray of light and the second planar ray of light respectively emitted by the horizontal laser emitter 31 and the vertical laser emitter 32 can be adjusted to preset positions.

The terms "horizontal" and "vertical" mentioned in this specification are relative to an orientation of the two-line laser emitter 100 after the two-line laser emitter is aligned to a vehicle during calibration of the vehicle. The term "horizontal" means that a laser line emitted by the laser emitter is to be projected onto the ground parallel to a front part of the vehicle. The term "vertical" means that the laser line emitted by the laser emitter is to be projected onto a central axis of the vehicle.

In this embodiment, the horizontal laser emitter 31 and the vertical laser emitter 32 are both line laser emitters capable of emitting planar rays of light.

The housing 10 is a cuboid and includes a housing body 11 and a back plate 12. The housing body 11 is a semi-closed structure. The back plate 12 covers the housing body 11 to form a receiving cavity of the housing 10. The laser emitter base 20, the laser emitter 30 and the adjustment elements 40 are all received in the receiving cavity of the housing 10.

A horizontal emission port 111 and a vertical emission port 112 are disposed on the housing body 11. The horizontal emission port 111 and the vertical emission port 112 are respectively configured to cause the planar rays of light emitted by the horizontal laser emitter 31 and the vertical laser emitter 32 to be emitted from inside of the housing 10. The horizontal emission port 111 is provided at a bottom of the housing body 11. The horizontal emission port is a straight opening. The vertical emission port 112 extends from a right-angled side of the bottom of the housing body 11 toward two side plates. The vertical emission port is an L-shaped opening. A plane where the vertical emission port 112 is located is perpendicular to the horizontal emission port 111.

The back plate 12 is configured to be mounted in a calibration support to fix the two-line laser emitter 100 to the calibration support. In this way, the calibration function of the two-line laser emitter 100 is achieved.

The laser emitter base 20 includes a mounting base 21 and fixing bases 22. The two fixing bases 22 are configured to fix the horizontal laser emitter 31 and the vertical laser emitter 32 to the mounting base 21 respectively.

The mounting base 21 is an integral structure to help mount the horizontal laser emitter 31 and the vertical laser emitter 32 inside the housing 10 together. Therefore, different from a split structure, the horizontal laser emitter 31 and the vertical laser emitter 32 do not need to be separately fixed and mounted inside the housing 10. This ensures mounting precision of the horizontal laser emitter 31 and the vertical laser emitter 32 to a specific extent.

The mounting base 21 is mounted to the back plate 12. A vertical laser emitter mounting hole 212 and a horizontal laser emitter mounting hole 211 are respectively provided at an upper part and a lower part of the mounting base 21. The horizontal laser emitter mounting hole 211 and the vertical laser emitter mounting hole 212 are respectively disposed opposite to the horizontal emission port 111 and the vertical emission port 112.

The horizontal laser emitter 31 and the vertical laser emitter 32 are respectively mounted in the horizontal laser emitter mounting hole 211 and the vertical laser emitter mounting hole 212. The horizontal laser emitter 31 and the vertical laser emitter 32 are respectively adapted to the horizontal laser emitter mounting hole 211 and the vertical laser emitter mounting hole 212. Apertures of the horizontal laser emitter mounting hole 211 and the vertical laser emitter mounting hole 212 are slightly larger than diameters of the horizontal laser emitter 31 and the vertical laser emitter 32 respectively. In this way, a space is reserved for adjusting the horizontal laser emitter 31 and the vertical laser emitter 32. Therefore, multi-dimensional adjustment may be performed on the horizontal laser emitter 31 and the vertical laser emitter 32 in the horizontal laser emitter mounting hole 211 and the vertical laser emitter mounting hole 212 respectively.

A central axis of the horizontal laser emitter 31 and a central axis of the vertical laser emitter 32 are arranged at a preset included angle in the same vertical plane. The vertical laser emitter mounting hole 212 is at an angle to a horizontal plane. Therefore, the vertical laser emitter 32 mounted therein can emit a planar ray of light obliquely forward through the vertical emission port 112. The horizontal laser emitter mounting hole 211 is perpendicular to the horizontal plane. Therefore, the horizontal laser emitter 31 mounted therein can emit a planar ray of light perpendicular to the ground through the horizontal emission port 111. In this embodiment, the preset included angle is 45 degrees. After the two-line laser emitter 100 is calibrated, the first planar ray of light 101 and the second planar ray of light 102 respectively emitted by the horizontal laser emitter 31 and the vertical laser emitter 32 intersect and are both perpendicular to the ground. The second planar ray of light 102 extends through a central line of the first planar ray of light 101. For details, refer to FIG. 7 below.

The two fixing bases 22 are respectively disposed on edges of the horizontal laser emitter mounting hole 211 and the vertical laser emitter mounting hole 212 and are both mounted in the mounting base 21. Therefore, the horizontal laser emitter 31 and the vertical laser emitter 32 are respectively mounted in the horizontal laser emitter mounting hole 211 and the vertical laser emitter mounting hole 212.

Preferably, the laser emitter base 20 further includes two elastic clamping members 23. The two elastic clamping members 23 are respectively mounted in the horizontal laser emitter mounting hole 211 and the vertical laser emitter mounting hole 212. The two elastic clamping members 23 are respectively sleeved on tail ends of the horizontal laser emitter 31 and the vertical laser emitter 32. Therefore, the tail ends of the horizontal laser emitter 31 and the vertical laser emitter 32 are respectively clamped to the edges of the horizontal laser emitter mounting hole 211 and the vertical laser emitter mounting hole 212, thereby helping the adjustment elements 40 adjust and calibrate the two-line laser emitter 100. In addition, the tail ends of the horizontal laser emitter 31 and the vertical laser emitter 32 are prevented from being attached to the edges of the horizontal laser emitter mounting hole 211 and the vertical laser emitter mounting hole 212 respectively. The horizontal laser emitter 31 and the vertical laser emitter 32 are respectively rotatable in the two elastic clamping members 23.

It may be understood that the two elastic clamping members 23 may also be respectively sleeved on head ends of the horizontal laser emitter 31 and the vertical laser emitter 32. In this case, the two elastic clamping members 23 are soft rubber rings with unsealed ends.

The elastic clamping member 23 sleeved on the horizontal laser emitter 31 is exemplified. The elastic clamping member 23 radially clamps the tail end of the horizontal laser emitter 31 tightly and is axially compressed between the fixing base 22 and the mounting base 21. At least a part of the elastic clamping member 23 is received in the mounting hole for the horizontal laser emitter 31. An other part is received in the fixing base 22. Therefore, the tail end of the horizontal laser emitter 31 is elastically clamped to the edge of the vertical laser emitter mounting hole 212. The horizontal laser emitter 31 is not easily rotated or moved relative to the vertical laser emitter mounting hole 212 without an external adjustment force. The head end of the horizontal laser emitter 31 may abut against a preset direction by using the corresponding adjustment element 40 to slightly adjust an angle of the planar ray of light emitted by the horizontal laser emitter 31. The elastic clamping member 23 on the vertical laser emitter 32 has the same function as the elastic clamping member 23 on the horizontal laser emitter 31. Therefore, details will not be described herein again.

In this embodiment, the elastic clamping member 23 is a soft colloid ring such as a rubber ring. This not only ensures that the horizontal laser emitter 31 and the vertical laser emitter 32 can be respectively clamped to the edges of the horizontal laser emitter mounting hole 211 and the vertical laser emitter mounting hole 212 but also allows the horizontal laser emitter 31 and the vertical laser emitter 32 to respectively rotate in the two elastic clamping members 23. In this way, failures of the horizontal laser emitter 31 and the vertical laser emitter 32 to rotate as a result of excessive frictions between the horizontal laser emitter and the vertical laser emitter and the elastic clamping members 23 are avoided. Certainly, the elastic clamping member 23 may also be other elastic elements such as a silicone ring or the like.

Figure 7:
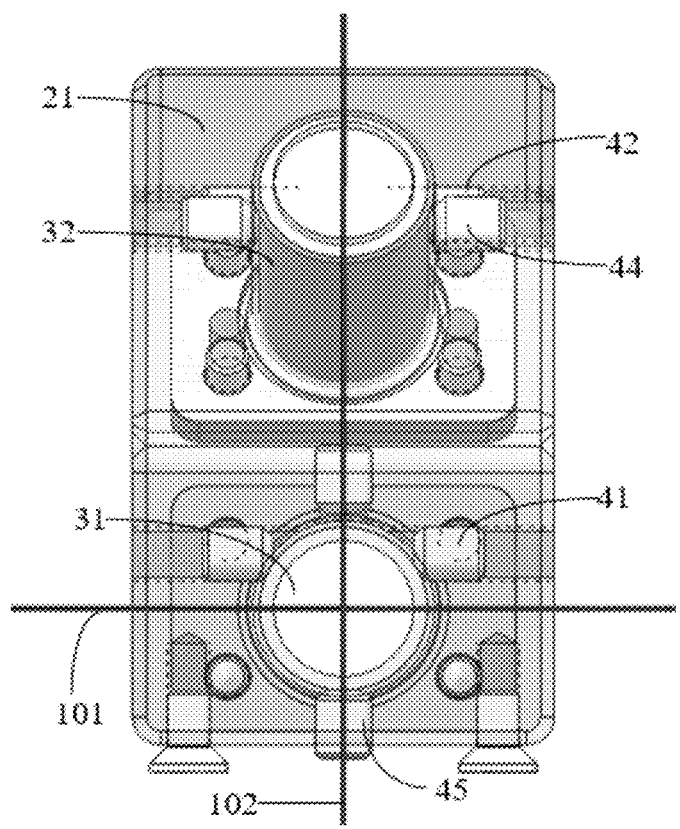
FIG. 7 is a perspective view of part of a structure of the two-line laser emitter.
Figure 8:
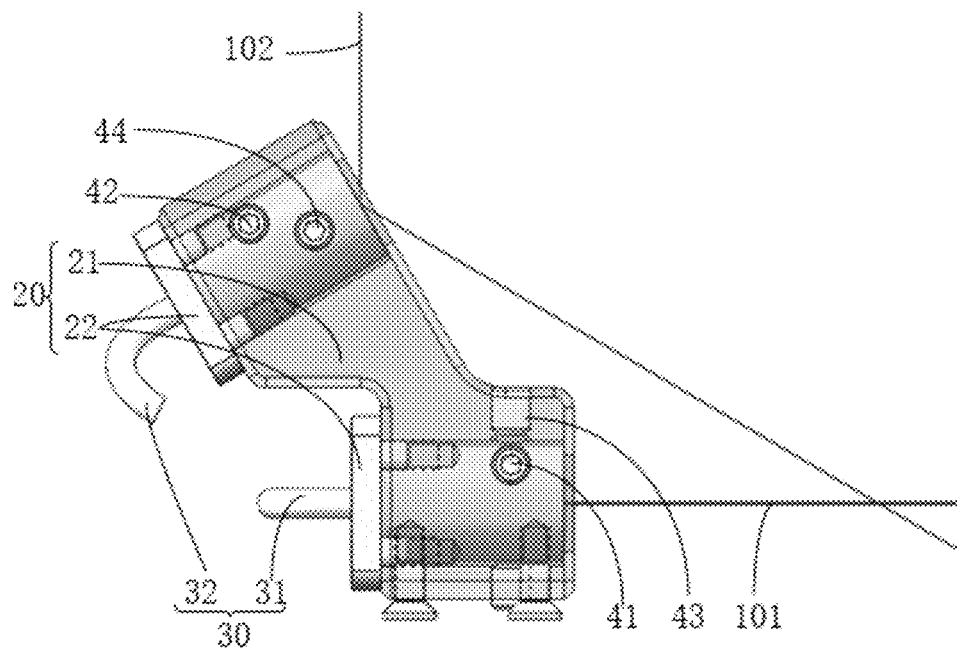
FIG. 8 is a schematic diagram of FIG. 7 from another perspective.
Figure 9:
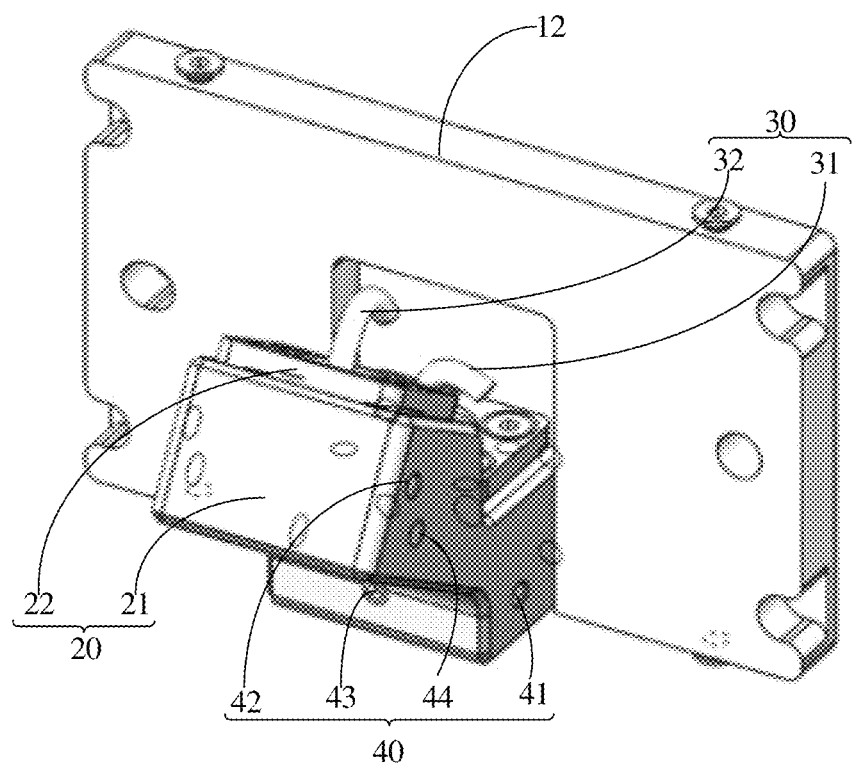
FIG. 9 is a partial schematic structural diagram in which a horizontal laser emitter and a vertical laser emitter are already assembled inside a housing.

Referring to FIG. 4 to FIG. 9 together, in order to more vividly and accurately describe a part of the structure of the two-line laser emitter 100, schematic diagrams FIG. 7 to FIG. 9 are provided. FIG. 7 is a perspective view of part of the structure of the two-line laser emitter 100. FIG. 8 is a schematic diagram of FIG. 7 from another perspective. FIG. 9 is a partial schematic structural diagram in which a horizontal laser emitter and a vertical laser emitter are already assembled inside a housing. In particular, positions of second rotation adjustment screws 42 in FIG. 7 and FIG. 8 are different from positions of the second rotation adjustment screws 42 in FIG. 4. That is to say, specific positions of the second rotation adjustment screws 42 and first rotation adjustment screws 41 may be selected according to actual needs, as long as the positions fall within limited ranges for the second rotation adjustment screws 42 and the first rotation adjustment screws 41 in the following embodiments. The adjustment elements 40 include rotation adjustment screws and swing adjustment screws. The rotation adjustment screws include the first rotation adjustment screws 41 and the second rotation adjustment screws 42. The swing adjustment screws include first swing adjustment screws 43 and second swing adjustment screws 44. The pair of first rotation adjustment screws 41 are configured to adjust a rotation angle of the first planar ray of light emitted by the horizontal laser emitter 31. The pair of second rotation adjustment screws 42 are configured to adjust a rotation angle of the second planar ray of light emitted by the vertical laser emitter 32. The pair of first swing adjustment screws 43 are configured to adjust an up-and-down swing angle of the first planar ray of light of the horizontal laser emitter 31. The pair of second swing adjustment screws 44 are configured to adjust a horizontal swing angle of the second planar ray of light of the vertical laser emitter 32. By adjusting the first rotation adjustment screws 41, the second rotation adjustment screws 42, the first swing adjustment screws 43 and the second swing adjustment screws 44, the two-line laser emitter 100 can emit planar rays of light to designated positions.

First rotation adjustment holes 213 and second rotation adjustment holes 214 are provided in the laser emitter base 20 for mounting the first rotation adjustment screws 41 and the second rotation adjustment screws 42 respectively.

The pair of first rotation adjustment holes 213 are on the same straight line, are perpendicular to a central axis of the horizontal laser emitter mounting hole 211, and are located on a side of any central axial plane of the horizontal laser emitter 31. The first rotation adjustment holes 213 laterally extend through the mounting base 21, are in communication with the horizontal laser emitter mounting hole 211, and are respectively located on two sides of the horizontal laser emitter mounting hole 211. The two first rotation adjustment screws 41 are respectively disposed at two ends of the first rotation adjustment holes 213. The two first rotation adjustment screws may be respectively screwed in or out of the mounting base 21 along the first rotation adjustment holes 213. Therefore, one ends of the first rotation adjustment screws 41 abut against the horizontal laser emitter 31 or are separated from the horizontal laser emitter 31. In this way, the rotation angle of the horizontal laser emitter 31 is adjusted.

Figure 4:
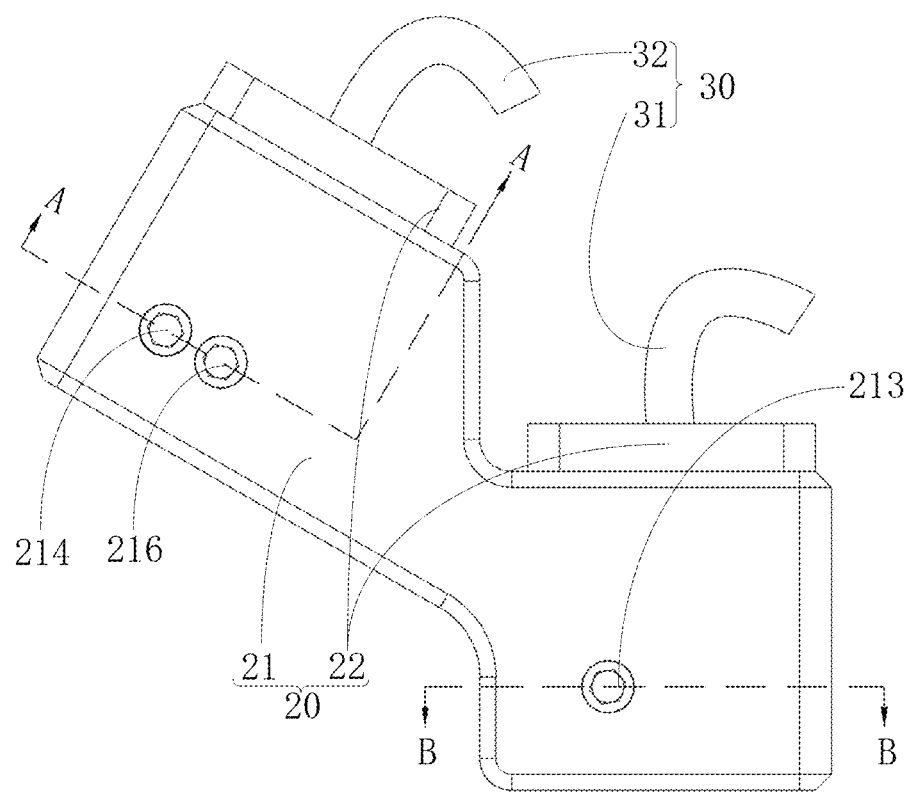
FIG. 4 is a partial schematic structural diagram of the two-line laser emitter.
Figure 5:
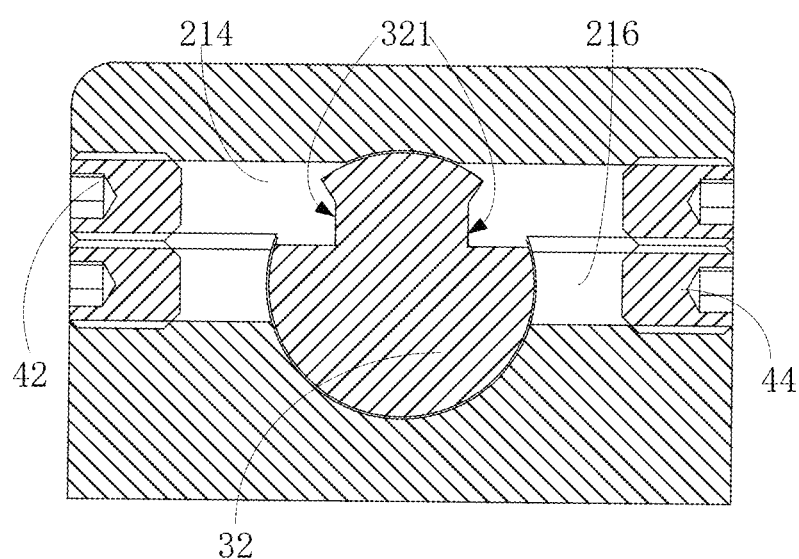
FIG. 5 is a cross-sectional view of a part A-A in FIG. 4.
Figure 6:
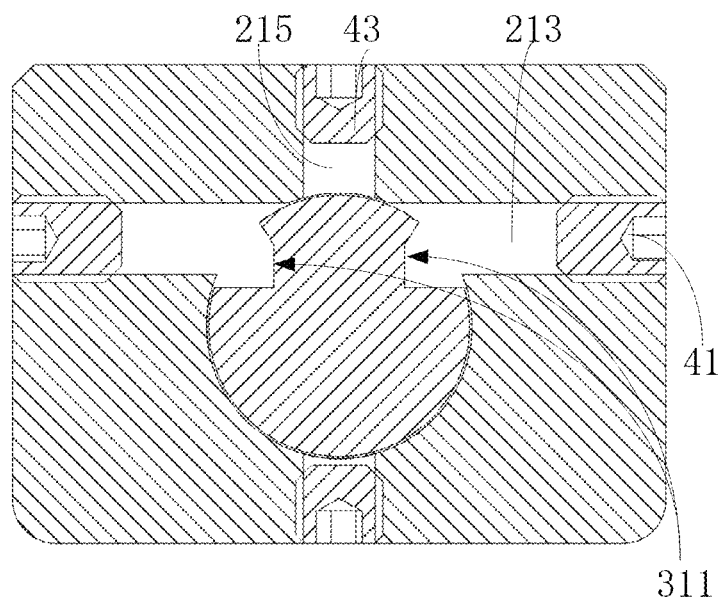
FIG. 6 is a cross-sectional view of a part B-B in FIG. 4.

Preferably, two first abutting faces 311 are disposed on the horizontal laser emitter 31. The two first abutting faces 311 and the first rotation adjustment holes 213 are substantially on the same straight line. One of the first abutting faces 311 corresponds to one end of the first rotation adjustment holes 213. That is to say, one of the first abutting faces 311 corresponds to one of the first rotation adjustment screws 41. One of the first rotation adjustment screws 41 is rotatable in an axial direction of the first rotation adjustment holes 213 to abut against a corresponding one of the first abutting faces 311. The first abutting faces 311 are grooves recessed on the horizontal laser emitter 31. Therefore, the rotation angle of the horizontal laser emitter 31 can be easily adjusted by using the first rotation adjustment screws 41 through the grooves. A torque generated by the first rotation adjustment screws 41 to the horizontal laser emitter 31 is maximized to avoid slippage between the first rotation adjustment screws 41 and the horizontal laser emitter 31. Referring to FIG. 4, in particular, when the central axis of the horizontal laser emitter 31 and a central axis of the horizontal laser emitter mounting hole 211 coincide, bottom surfaces of the grooves are located below the first rotation adjustment holes 213 and are perpendicular to the first rotation adjustment holes 213 at a preset distance. Therefore, the horizontal laser emitter 31 can be rotated by using the first rotation adjustment screws 41 within a preset included angle range. When the horizontal laser emitter 31 is rotated to a limit angle by using one of the first rotation adjustment screws 41, one of the bottom surfaces of the grooves abuts against one of the first rotation adjustment screws 41. Therefore, the first rotation adjustment screw 41 cannot continue to move in a direction in which the horizontal laser emitter 31 is rotated. It may be understood the preset distance between the bottom surfaces of the grooves and the first rotation adjustment holes 213 may be set according to actual needs, to change a rotation angle range of the horizontal laser emitter 31 accordingly.

One of the first rotation adjustment screws 41 is screwed along one of the first rotation adjustment holes 213 to abut against a corresponding one of the first abutting faces 311. Therefore, the horizontal laser emitter 31 can be rotated in a first direction relative to the horizontal laser emitter mounting hole 211. Another of the first rotation adjustment screws 41 is screwed along another of the first rotation adjustment holes 213, to abut against another of the first abutting faces 311. Therefore, the horizontal laser emitter 31 can be rotated in a second direction relative to the horizontal laser emitter mounting hole 211. The first direction is opposite to the second direction. During rotation of the horizontal laser emitter 31, one of the first rotation adjustment screws 41 is separated from the corresponding one of the first abutting faces 311, and the other of the first rotation adjustment screws 41 abuts against the corresponding other of the first abutting faces 311 to rotate the horizontal laser emitter 31. By screwing the two first rotation adjustment screws 41 toward centers of the first rotation adjustment holes 213 respectively, the two first rotation adjustment screws 41 can respectively abut against the two first abutting faces 311 respectively. At this time, the rotation angle of the horizontal laser emitter 31 is fixed.

During adjustment of the rotation angle of the horizontal laser emitter 31, specifically, one of the first rotation adjustment screws 41 may be first screwed out along one of the first rotation adjustment holes 213 to keep a specific distance from the corresponding one of the first abutting faces 311. Then the other of the first rotation adjustment screws 41 is screwed in from the other end of the first rotation adjustment holes 213. Therefore, the first rotation adjustment screw abuts against the corresponding other of first abutting faces 311, and the horizontal laser emitter 31 is caused to abut against the other end of the first rotation adjustment holes 213. At this time, since the tail end of the horizontal laser emitter 31 is elastically clamped to the edge of the horizontal laser emitter mounting hole 211 by using the elastic clamping member 23, the horizontal laser emitter 31 rotates about a central axis thereof under a torque. The two first rotation adjustment screws 41 may be respectively screwed in or out along the two ends of the first rotation adjustment holes 213 repeatedly to rotate the horizontal laser emitter 31 to a desired angle. Finally, the two first rotation adjustment screws 41 are screwed in at the same time. Therefore, the two first rotation adjustment screws 41 abut against the horizontal laser emitter 31 at the same time. In this way, the horizontal laser emitter 31 is fixed at the desired angle.

The pair of second rotation adjustment holes 214 are on the same straight line, are perpendicular to a central axis of the vertical laser emitter mounting hole 211 and are located on a side of any central axial plane of the vertical laser emitter 32. The second rotation adjustment holes 214 laterally extend through the mounting base 21, are in communication with the vertical laser emitter mounting hole 212 and are respectively located on two sides of the vertical laser emitter mounting hole 212. The two second rotation adjustment screws 42 are respectively disposed at two ends of the second rotation adjustment holes 214. The two second rotation adjustment screws may be respectively screwed in or out of the mounting base 21 along the second rotation adjustment holes 214. Therefore, one ends of the second rotation adjustment screws 42 abut against the vertical laser emitter 32 or are separated from the vertical laser emitter 32. In this way, the rotation angle of the vertical laser emitter 32 is adjusted.

Preferably, two second abutting faces 321 are disposed on the vertical laser emitter 32. The two second abutting faces 321 and the second rotation adjustment holes 214 are substantially on the same line. One of the second abutting faces 321 corresponds to one end of the second rotation adjustment holes 214. That is to say, one of the second abutting faces 321 corresponds to one of the second rotation adjustment screws 42. One of the second rotation adjustment screws 42 is rotatable in an axial direction of the second rotation adjustment holes 214 to abut against a corresponding one of the second abutting faces 321. The second abutting faces 321 are grooves recessed on the vertical laser emitter 32. Arrangement of the grooves of the vertical laser emitter 32 is the same as the arrangement of the grooves of the horizontal laser emitter 31. Therefore, details will not be described herein again.

A principle of adjusting a rotation angle of the vertical laser emitter 32 by using the second rotation adjustment screws 42 is the same as the principle of adjusting the horizontal laser emitter 31 by using the first rotation adjustment screws 41. Therefore, details will not be described herein again.

First swing adjustment holes 215 are provided on the mounting base 21 for mounting the first swing adjustment screws 43.

The pair of first swing adjustment holes 215 are on the same straight line and are horizontally located in the mounting base 21. The first swing adjustment holes 215 are located on the central axial plane of the horizontal laser emitter 31 and are perpendicular to the horizontal emission port 111. The first swing adjustment holes 215 laterally extend through the mounting base 21, are in communication with the horizontal laser emitter mounting hole 211 and are respectively located on two sides of the horizontal laser emitter mounting hole 211. The two first swing adjustment screws 43 are respectively disposed at two ends of the first swing adjustment holes 215. The two first swing adjustment screws may be respectively screwed in or out of the mounting base 21 along the first swing adjustment holes 215. Therefore, one ends of the first swing adjustment screws 43 abut against the horizontal laser emitter 31 or separated from the horizontal laser emitter 31. In this way, an up-and-down swing angle of the horizontal laser emitter 31 is adjusted.

During adjustment of the up-and-down swing angle of the horizontal laser emitter 31, specifically, one of the first swing adjustment screws 43 may be first screwed out along one of the first swing adjustment holes 215 to keep a specific distance from one side of the horizontal laser emitter 31. Then the other of the first swing adjustment screws 43 is screwed in from the other end of the first swing adjustment holes 215. Therefore, the first swing adjustment screw abuts against another side of the horizontal laser emitter 31 and the horizontal laser emitter 31 is caused to abut against an opposite side. At this time, since the tail end of the horizontal laser emitter 31 is elastically clamped to the edge of the horizontal laser emitter mounting hole 211 by using the elastic clamping member 23, the horizontal laser emitter 31 is swung toward the opposite side under pushing. The two first swing adjustment screws 43 may be respectively screwed in or out along the first swing adjustment holes 215 repeatedly to swing the horizontal laser emitter 31 to a desired angle. Finally, the two first swing adjustment screws 43 are screwed in at the same time. Therefore, the two first swing adjustment screws 43 abut against the horizontal laser emitter 31 at the same time. In this way, the horizontal laser emitter 31 is fixed at the desired angle. In this embodiment, the first planar ray of light of the horizontal laser emitter 31 is emitted perpendicular to the ground exactly through the horizontal emission port 1121.

Second swing adjustment holes 216 are provided on the mounting base 21 for mounting the second swing adjustment screws 44.

The pair of second swing adjustment holes 216 are on the same straight line and are horizontally located in the mounting base 21. The second swing adjustment holes 216 are located on the central axial plane of the vertical laser emitter 32 and are perpendicular to the vertical emission port 112. The second swing adjustment holes 216 laterally extend through the mounting base 21, are in communication with the vertical laser emitter mounting hole 212 and are respectively located on two sides of the vertical laser emitter mounting hole 212. The two second swing adjustment screws 44 are respectively disposed at two ends of the second swing adjustment holes 216. The two second swing adjustment screws may be respectively screwed in or out of the mounting base 21 along the second swing adjustment holes 216. Therefore, one ends of the second swing adjustment screws 44 abut against the vertical laser emitter 32 or separated from the vertical laser emitter 32. In this way, the up-and-down swing angle of the vertical laser emitter 32 is adjusted.

A principle of adjusting the swing angle of the vertical laser emitter 32 by using the second swing adjustment screws 44 is the same as the principle of adjusting the horizontal laser emitter 31 by using the first swing adjustment screws 43. Therefore, details will not be described herein again. In this embodiment, the second planar ray of light of the vertical laser emitter 32 is emitted perpendicular to the ground exactly through the vertical emission port 112. The second planar ray of light intersects the first planar ray of light.

It may be understood that, in the foregoing embodiment, the two elastic clamping members 23 are respectively sleeved on the tail ends of the horizontal laser emitter 31 and the vertical laser emitter 32. The first swing adjustment screws 43 and the second swing adjustment holes 216 are respectively provided at the head ends of the horizontal laser emitter 31 and the vertical laser emitter 32. However, in other embodiments, when the two elastic clamping members 23 are respectively sleeved on the head ends of the horizontal laser emitter 31 and the vertical laser emitter 32 and the first swing adjustment screws 43, the second swing adjustment holes 216 may be respectively provided at the tail ends of the horizontal laser emitter 31 and the vertical laser emitter 32.

Figure 10:
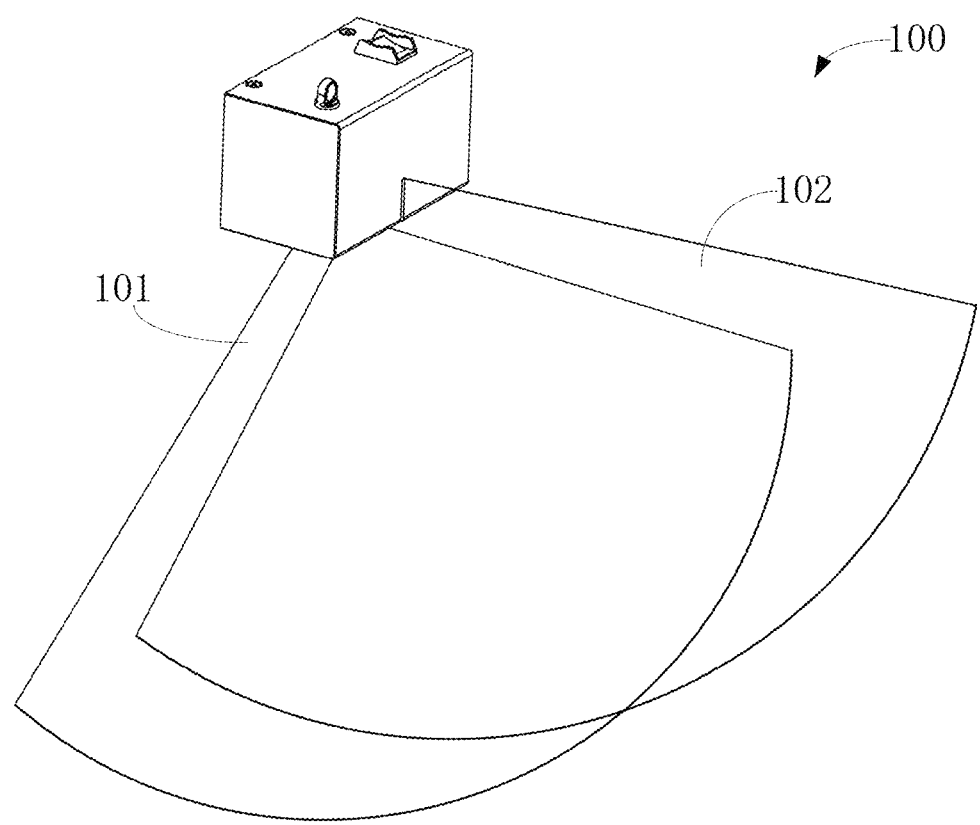
FIG. 10 is a usage status diagram of the two-line laser emitter in FIG. 4.

Referring to FIG. 9 and FIG. 10 together, FIG. 10 is a usage status diagram of the two-line laser emitter 100. Angle adjustment may be performed on the horizontal laser emitter 31 and the vertical laser emitter 32 by using the corresponding adjustment elements 40 respectively. The second planar ray of light 102 emitted by the vertical laser emitter 32 and the first planar ray of light 101 emitted by the horizontal laser emitter 31 are perpendicular to each other and are both emitted perpendicular to the bottom surface.

In some other embodiments, the horizontal laser emitter mounting hole 211 and the vertical laser emitter mounting hole 212 are both rectangular holes. A diameter of the horizontal laser emitter 31 is equal to a width of the rectangular hole. Therefore, the horizontal laser emitter 31 is movable only in a length direction of the rectangular hole during adjustment of the swing angle of the horizontal laser emitter 31 along the first swing adjustment holes 215 by using the first swing adjustment screws 43. In this way, adjustment precision of the horizontal laser emitter 31 is ensured. A diameter of the vertical laser emitter 32 is equal to the width of the rectangular hole. Therefore, the vertical laser emitter 32 is movable only in the length direction of the rectangular hole during adjustment of the swing angle of the vertical laser emitter 32 along the second swing adjustment holes 216 by using the second swing adjustment screws 44. In this way, adjustment precision of the vertical laser emitter 32 is ensured.

Referring to FIG. 1 to FIG. 3 again, in some other embodiments, the two-line laser emitter 100 further includes a cell box 50, a PCB control board 60, a power switch 70 and an anti-drop hook 80.

The cell box 50 is mounted in the housing body 11 and is configured to receive cells to supply working power to the two-line laser emitter 100. The power switch 70 is mounted in the housing body 11 and is configured to turn on or off a working power supply, so as to turn on or turn off the horizontal laser emitter 31 and the vertical laser emitter 32. The PCB control board 60 is mounted on the back plate 12 and received in the receiving cavity of the housing 10. The PCB control board is configured to control the horizontal laser emitter 31 and the vertical laser emitter 32 to emit the planar rays of light. The anti-drop hook 80 is mounted on a top of the housing body 11 and is configured to be hung on the calibration support to prevent the two-line laser emitter 100 from falling off the calibration support.

Figure 11:
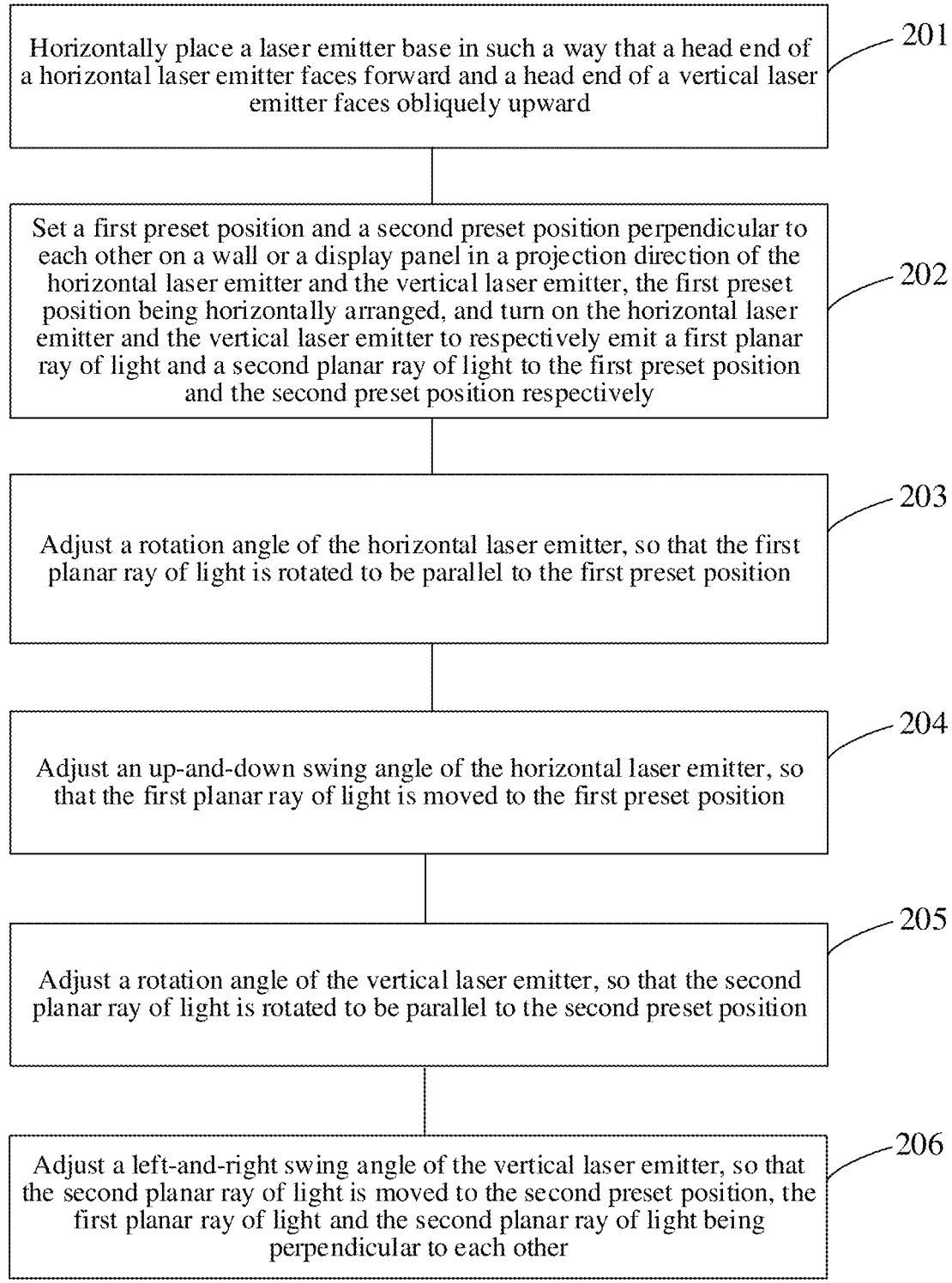
FIG. 11 is a flowchart of a method for calibrating a two-line laser emitter according to another embodiment of the disclosure.

Another embodiment of the disclosure further provides a calibration method for calibrating the two-line laser emitter 100. The method is implemented by using the two-line laser emitter 100 provided in the foregoing embodiment. Referring to FIG. 11, the method includes the following steps.

201: Horizontally place the laser emitter base in such a way that a head end of the horizontal laser emitter faces forward and a head end of the vertical laser emitter faces obliquely upward.

The laser emitter base 20 where the horizontal laser emitter 31 and the vertical laser emitter 32 are mounted is horizontally placed in such a way that the head end of the horizontal laser emitter 31 is oriented forward and the head end of the vertical laser emitter 32 is oriented obliquely upward.

202: Set a first preset position and a second preset position perpendicular to each other on a wall or a display panel in a projection direction of the horizontal laser emitter and the vertical laser emitter, the first preset position being horizontally arranged, and turn on the horizontal laser emitter and the vertical laser emitter to respectively emit a first planar ray of light and a second planar ray of light to the first preset position and the second preset position respectively.

It is checked whether the first planar ray of light and the second planar ray of light respectively emitted by the horizontal laser emitter 31 and the vertical laser emitter 32 coincide with the first preset position and the second preset position respectively. If the first planar ray of light and the second planar ray of light respectively coincide with the first preset position and the second preset position, the calibration may end. Otherwise, the following calibration steps are performed. The first preset position and the second preset position may be two straight lines.

203: Adjust a rotation angle of the horizontal laser emitter so that the first planar ray of light is rotated to be parallel to the first preset position.

Two first rotation adjustment screws 41 are adjusted, so that the first planar ray of light 101 is rotated to be parallel to the first preset position.

204: Adjust an up-and-down swing angle of the horizontal laser emitter, so that the first planar ray of light is moved to the first preset position.

Two first swing adjustment screws 43 are adjusted, so that the first planar ray of light 101 is parallel to the first preset position.

205: Adjust a rotation angle of the vertical laser emitter, so that the second planar ray of light is rotated to be parallel to the second preset position.

Corresponding two second rotation adjustment screws 42 are adjusted, so that the second planar ray of light 102 is rotated to be parallel to the second preset position.

206: Adjust a left-and-right swing angle of the vertical laser emitter, so that the second planar ray of light is moved to the second preset position, the first planar ray of light and the second planar ray of light being perpendicular to each other.

Two second swing adjustment screws 44 are adjusted, so that the second planar ray of light 102 is moved to the second preset position.

The foregoing method can eliminate a slight error in a laser surface emission direction of the laser emitters 31 and 32 and can cause the emission direction of the two-line laser emitter 100 leaving factory to conform to a preset position.

After the planar ray of light of the two-line laser emitter 100 is calibrated, the two-line laser emitter 100 may be configured to mark a center position of a calibration frame or a target hung on the calibration frame.

In some embodiments, before the rotation angle of the horizontal laser emitter 31 is adjusted, glue may be applied to the first rotation adjustment screws 41, the second rotation adjustment screws 42, the first swing adjustment screws 43 and the second swing adjustment screws 44. Therefore, after the first planar ray of light 101 and the second planar ray of light 102 of the two-line laser emitter 100 are calibrated, the first rotation adjustment screws 41, the second rotation adjustment screws 42, the first swing adjustment screws 43 and the second swing adjustment screws 44 can be fixed to the mounting base 21 and are prevented from loosening. Also, the horizontal laser emitter 31 and the vertical laser emitter 32 are respectively statically fixed in the horizontal laser emitter mounting hole 211 and the vertical laser emitter mounting hole 212 relative to the mounting base 21. In this way, the first planar ray of light 101 and the second planar ray of light 102 that can be emitted are fixed at preset positions to ensure marking precision of the two-line laser emitter 100.

In some other embodiments, after the left-and-right swing angle of the vertical laser emitter 32 is adjusted, glue may be applied between the horizontal laser emitter 31 and the corresponding elastic clamping member 23 and between the vertical laser emitter 32 and the other corresponding elastic clamping member 23. Therefore, the horizontal laser emitter 31 and the vertical laser emitter 32 are respectively statically fixed in the horizontal laser emitter mounting hole 211 and the vertical laser emitter mounting hole 212 relative to the mounting base 21. In this way, the first planar ray of light 101 and the second planar ray of light 102 that are emitted can be fixed at preset positions to ensure marking precision of the two-line laser emitter 100.

It should be noted that, the specification of the disclosure and the accompanying drawings thereof illustrate preferred embodiments of the disclosure. However, the disclosure can be implemented in various different forms, and is not limited to the embodiments described in this specification. These embodiments are not intended to be an additional limitation on the content of the disclosure. These embodiments are described for the purpose of providing a more thorough and comprehensive understanding of the content disclosed in the disclosure. Moreover, the above technical features can further be combined to form various embodiments not listed above. All such embodiments shall be construed as falling within the scope of the disclosure. Further, those of ordinary skill in the art may make improvements and variations according to the above descriptions. Such improvements and variations shall all fall within the protection scope of the appended claims of the disclosure.

What is claimed is:

1. A two-line laser emitter, comprising:
a housing;
a laser emitter base mounted inside the housing, the laser emitter base having a laser emitter mounting hole;
an elastic clamping member mounted in the laser emitter mounting hole;
a laser emitter mounted in the laser emitter mounting hole, one end of the laser emitter being inserted into the elastic clamping member, and the laser emitter configured to emit a planar ray of light out of the housing; and
a pair of rotation adjustment screws disposed in the laser emitter base and located on the same side of a central axial plane of the laser emitter, the pair of rotation adjustment screws abutting against a side wall of the laser emitter in opposite directions on the same straight line, and each of the rotation adjustment screws being adjustable to slightly adjust a rotation angle of the planar ray of light emitted by the laser emitter.

2. The two-line laser emitter according to claim 1, wherein the laser emitter is a horizontal laser emitter, the laser emitter mounting hole is a horizontal laser emitter mounting hole, the elastic clamping member is a horizontal laser emitter elastic clamping member, and the pair of rotation adjustment screws are a pair of first rotation adjustment screws;

the laser emitter base further has a vertical laser emitter mounting hole; and
the two-line laser emitter further comprises:
a vertical laser emitter elastic clamping member mounted in the vertical laser emitter mounting hole;
a vertical laser emitter mounted in the vertical laser emitter mounting hole, one end of the vertical laser emitter being inserted into the vertical laser emitter elastic clamping member, and the vertical laser emitter configured to emit a planar ray of light out of the housing; and
a pair of second rotation adjustment screws disposed in the laser emitter base and located on the same side of a central axial plane of the vertical laser emitter, the pair of second rotation adjustment screws abutting against a side wall of the vertical laser emitter in opposite directions on the same straight line, each of the second rotation adjustment screws being adjustable to slightly adjust a rotation angle of the planar ray of light emitted by the vertical laser emitter, the planar ray of light emitted by the horizontal laser emitter being perpendicular to the planar ray of light emitted by the vertical laser emitter.

3. The two-line laser emitter according to claim 2, wherein a central axis of the horizontal laser emitter and a central axis of the vertical laser emitter are arranged at a preset included angle in the same vertical plane.

4. The two-line laser emitter according to claim 3, wherein the preset included angle is 45 degrees.

5. The two-line laser emitter according to claim 2, wherein each of the horizontal laser emitter and the vertical laser emitter has a pair of abutting faces, the pair of abutting faces respectively corresponding to the pair of rotation adjustment screws, and one of the rotation adjustment screws abutting against a corresponding one of the abutting faces.

6. The two-line laser emitter according to claim 5, wherein the abutting faces are grooves recessed into the laser emitter.

7. The two-line laser emitter according to claim 2, further comprising a pair of first swing adjustment screws horizontally disposed in the laser emitter base and located on the central axial plane of the horizontal laser emitter, the pair of first swing adjustment screws abutting against the side wall at another end of the horizontal laser emitter in opposite directions on the same straight line, and each of the first swing adjustment screws being adjustable to slightly adjust an up-and-down swing angle of the planar ray of light emitted by the horizontal laser emitter.

8. The two-line laser emitter according to claim 2, further comprising a pair of second swing adjustment screws horizontally disposed in the laser emitter base and located on the central axial plane of the vertical laser emitter, the pair of second swing adjustment screws abutting against the vertical laser emitter in opposite directions on the same straight line, and each of the second swing adjustment screws being adjustable to slightly adjust a left-and-right swing angle of the planar ray of light emitted by the vertical laser emitter.

9. A method for calibrating a two-line laser emitter, the two-line laser emitter comprising;
a housing;
a laser emitter base mounted inside the housing;
two laser emitters comprising a horizontal laser emitter and a vertical laser emitter,
each laser emitter mounted in a laser emitter mounting hole on the laser emitter base, one end of the each laser emitter being inserted into an elastic clamping member mounted in the laser emitter mounting hole, and the each laser emitter configured to emit a planar ray of light out of the housing; and a pair of rotation adjustment screws disposed in the laser emitter base and located on the same side of a central axial plane of the each laser emitter, the pair of rotation adjustment screws abutting against a side wall of the each laser emitter in opposite directions on the same straight line, and each of the rotation adjustment screws being adjustable to slightly adjust a rotation angle of the planar ray of light emitted by the each laser emitter;

the method comprising:

emitting, by the horizontal laser emitter, a first planar ray of light, and emitting, by the vertical laser emitter, a second planar ray of light;

adjusting a rotation angle of the horizontal laser emitter, so that the first planar ray of light is rotated to be parallel to a first preset position;

adjusting an up-and-down swing angle of the horizontal laser emitter, so that the first planar ray of light is moved to coincide with the first preset position;

adjusting a rotation angle of the vertical laser emitter, so that the second planar ray of light is rotated to be parallel to a second preset position; and adjusting a left-and-right swing angle of the vertical laser emitter, so that the second planar ray of light is moved to coincide with the second preset position, the first planar ray of light and the second planar ray of light being perpendicular to each other.

10. The method according to claim 9, wherein the first planar ray of light is rotated to be parallel to the first preset position by adjusting a pair of first rotation adjustment screws.

11. The method according to claim 10, wherein the first planar ray of light is moved to coincide with the first preset position by adjusting the pair of first swing adjustment screws.

12. The method according to claim 11, wherein the second planar ray of light is rotated to be parallel to the second preset position by adjusting a pair of second rotation adjustment screws.

13. The method according to claim 12, wherein the second planar ray of light is moved to coincide with the second preset position by adjusting the second swing adjustment screws.

14. The method according to claim 13, wherein before the adjusting a rotation angle of the horizontal laser emitter, the method further comprises applying glue to the first rotation adjustment screws, the second rotation adjustment screws, the first swing adjustment screws, and the second swing adjustment screws.

15. The method according to claim 13, wherein after the adjusting a left-and-right swing angle of the vertical laser emitter, the method further comprises applying glue between the horizontal laser emitter and a corresponding elastic clamping member and applying glue between the vertical laser emitter and another corresponding elastic clamping member.

* * * * *